United States Patent
Lin et al.

(10) Patent No.: US 7,985,026 B1
(45) Date of Patent: Jul. 26, 2011

(54) GUIDING CONNECTOR FOR OPTICAL FIBER EXTENSION

(75) Inventors: Song Fure Lin, Hsinchu (TW); Cheng Lih Liu, Zhubei (TW); Vivian Kung, Zhubei (TW); Janpu Hou, Taipei (TW); Pinsung Wang, Zhubei (TW); Wally Hua, Taipei (TW); Archer Shu, Chiung-Lin Township, Hsinchu County (TW)

(73) Assignee: Foci Fiber Optic Communications, Inc., Hsinchu (TW)

( * ) Notice: Subject to any disclaimer, the term of this patent is extended or adjusted under 35 U.S.C. 154(b) by 0 days.

(21) Appl. No.: 12/775,840

(22) Filed: May 7, 2010

(51) Int. Cl.
    *G02B 6/36*     (2006.01)
    *G02B 6/38*     (2006.01)

(52) U.S. Cl. ............... 385/71; 385/55; 385/70; 385/73; 385/74; 385/75

(58) Field of Classification Search .................. None
See application file for complete search history.

(56) References Cited

U.S. PATENT DOCUMENTS

| | | | | |
|---|---|---|---|---|
| 4,818,059 A * | 4/1989 | Kakii et al. | ..................... | 385/65 |
| 5,241,612 A * | 8/1993 | Iwama | ..................... | 385/74 |
| 5,422,971 A * | 6/1995 | Honjo et al. | ..................... | 385/80 |
| 5,815,621 A * | 9/1998 | Sakai et al. | ..................... | 385/80 |
| 5,867,620 A * | 2/1999 | Bunin et al. | ..................... | 385/53 |
| 5,923,803 A * | 7/1999 | Bunin et al. | ..................... | 385/80 |
| 6,340,247 B1 * | 1/2002 | Sakurai et al. | ..................... | 385/78 |
| 6,629,781 B2 * | 10/2003 | Shigenaga et al. | ..................... | 385/78 |
| 6,676,299 B1 * | 1/2004 | Durrant et al. | ..................... | 385/71 |
| 6,767,136 B1 * | 7/2004 | Durrant et al. | ..................... | 385/71 |
| 6,910,808 B2 * | 6/2005 | Shigenaga et al. | ..................... | 385/71 |
| 7,588,374 B2 * | 9/2009 | Nishimura et al. | ..................... | 385/60 |
| 2003/0174971 A1 * | 9/2003 | Shigenaga et al. | ..................... | 385/71 |
| 2004/0057671 A1 * | 3/2004 | Kang et al. | ..................... | 385/71 |
| 2004/0109646 A1 * | 6/2004 | Anderson et al. | ..................... | 385/71 |

\* cited by examiner

*Primary Examiner* — Rhonda S Peace
(74) *Attorney, Agent, or Firm* — Alan Kamrath; Kamrath & Associates PA (57) ABSTRACT

A guiding connector for optical fiber extension has a positioning section in the accommodating hole to receive a optical fiber and has a ventilative recess defined on one side to communicate with the positioning section of the accommodating hole. The positioning section adjacent to the ventilative recess achieves a ventilative portion to discharge gas inside the positioning section so that optical fibers are assembled and processed precisely and rapidly.

8 Claims, 11 Drawing Sheets

GUIDING CONNECTOR FOR OPTICAL FIBER EXTENSION

BACKGROUND OF THE INVENTION

1. Field of the Invention

The present invention relates to a guiding connector for optical fiber extension and, more particular, to a guiding connector that provides a structure for penetration and attachment of optical fibers.

2. Description of Related Art

Optical fiber cable has a rapid transmission characteristic, and, more particularly, it can sufficiently isolate a noisy signal from electromagnetic waves to avoid disturbance when transmitting the signal. The optical fiber cable also has advantages such as wide-band and low-loss for signal transmission. However, two optical fiber cables shall be connected for signal transmission connection or terminal treatment. A guiding connector is attached to the end of the optical fiber cable to engage with another guiding connector or a terminal treatment to connect the two optical fiber cables. Because the optical fiber transmits the optical signal but not conventional electronic signals, the guiding connector connects the two optical fiber cables in parallel to make the optical signal transmitted with precise alignment and without loss. Therefore, the steric position of the guiding connector for combination of the optical fiber cables is very important.

Figure 1:
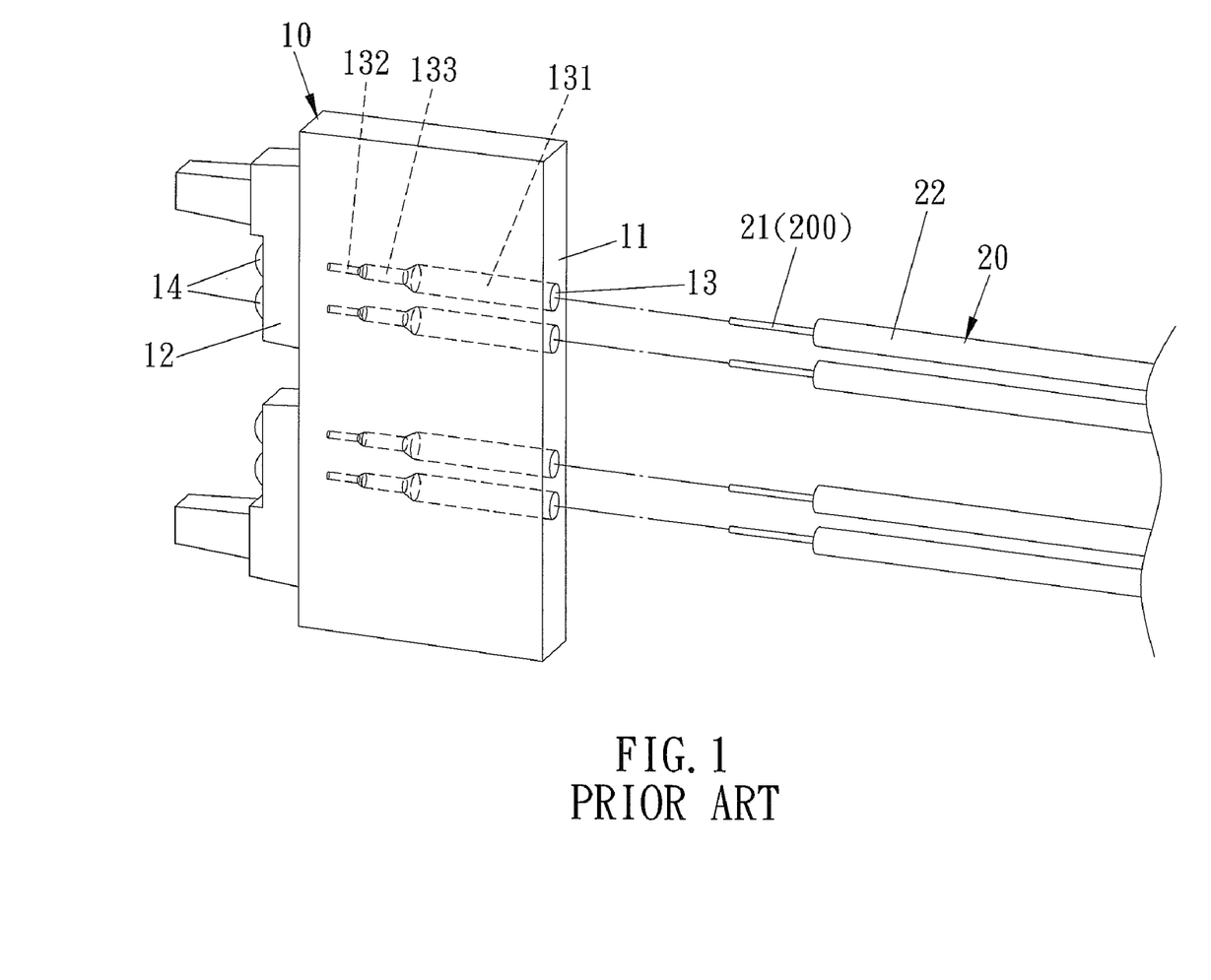
FIG. 1 is an exploded perspective view of a conventional guiding connector for optical fiber cables in accordance with the prior art.

FIG. 1 shows a conventional guiding connector 10 in accordance with the prior art combining at least one optical fiber cable 20 for assembly.

The optical fiber cable 20 is composed of an optical fiber 21 wrapped by a tube 22.

The guiding connector 10 has a first end 11 and a second end 12. The first end 11 has at least one accommodating hole 13 extending to the second end 12 and being a blind hole. One end of the accommodating hole 13 is an expansion section 131 having a large diameter to make the optical fiber cable 20 easily accessible. Another end of the accommodating hole 13 is a positioning section 132 having a small diameter which is of 0.0-0.5 micrometer slightly larger than an outer diameter of the optical fiber cable 20. A guiding section 133 with two tapered ends is defined between the expansion section 131 and the positioning section 132. The second end 12 of the guiding connector 10 has at least one convex lens 14 aligning the at least one accommodating hole 13 correspondingly.

Figure 2:
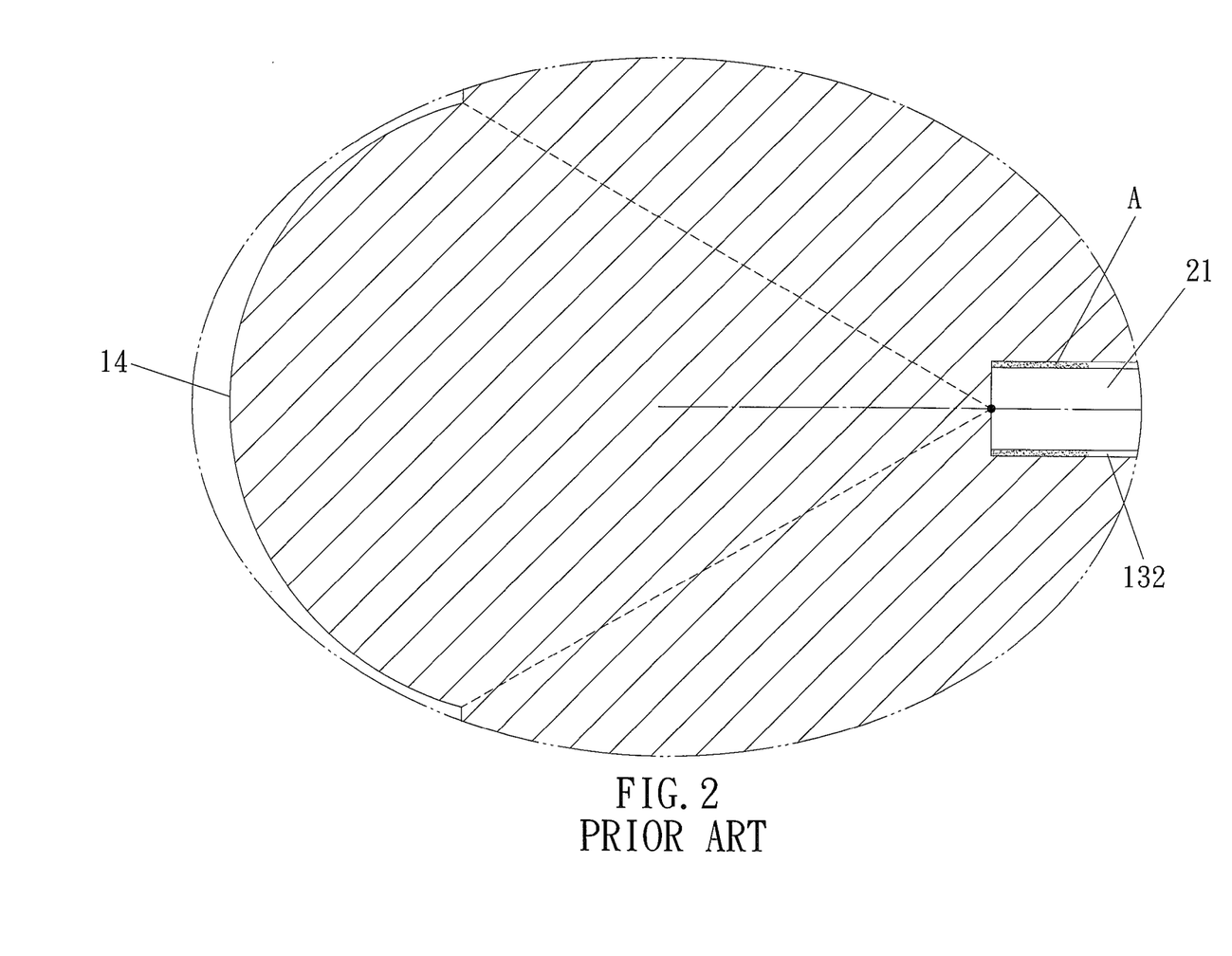
FIG. 2 is a cross-sectional side view of the conventional guiding connector with precise alignment.

Combination of the guiding connector 10 and the optical fiber cable 20 is shown in FIG. 2. The optical fiber cable 20 has a distal end 200 with the tube 22 removed to expose the optical fiber 21 coated with glue A. The distal end penetrates the expansion section 131 of the accommodating hole 13 at the first end 11 and enters into the positioning section 132 via the tapered ends of the guiding section 133. When the distal end 200 of the optical fiber cable 20 flushes with a bottom of the positioning section 132 of the accommodating hole 13 and the glue A is dried, combination of the conventional guiding connector 10 and the optical fiber cable 20 is achieved.

Figure 3:
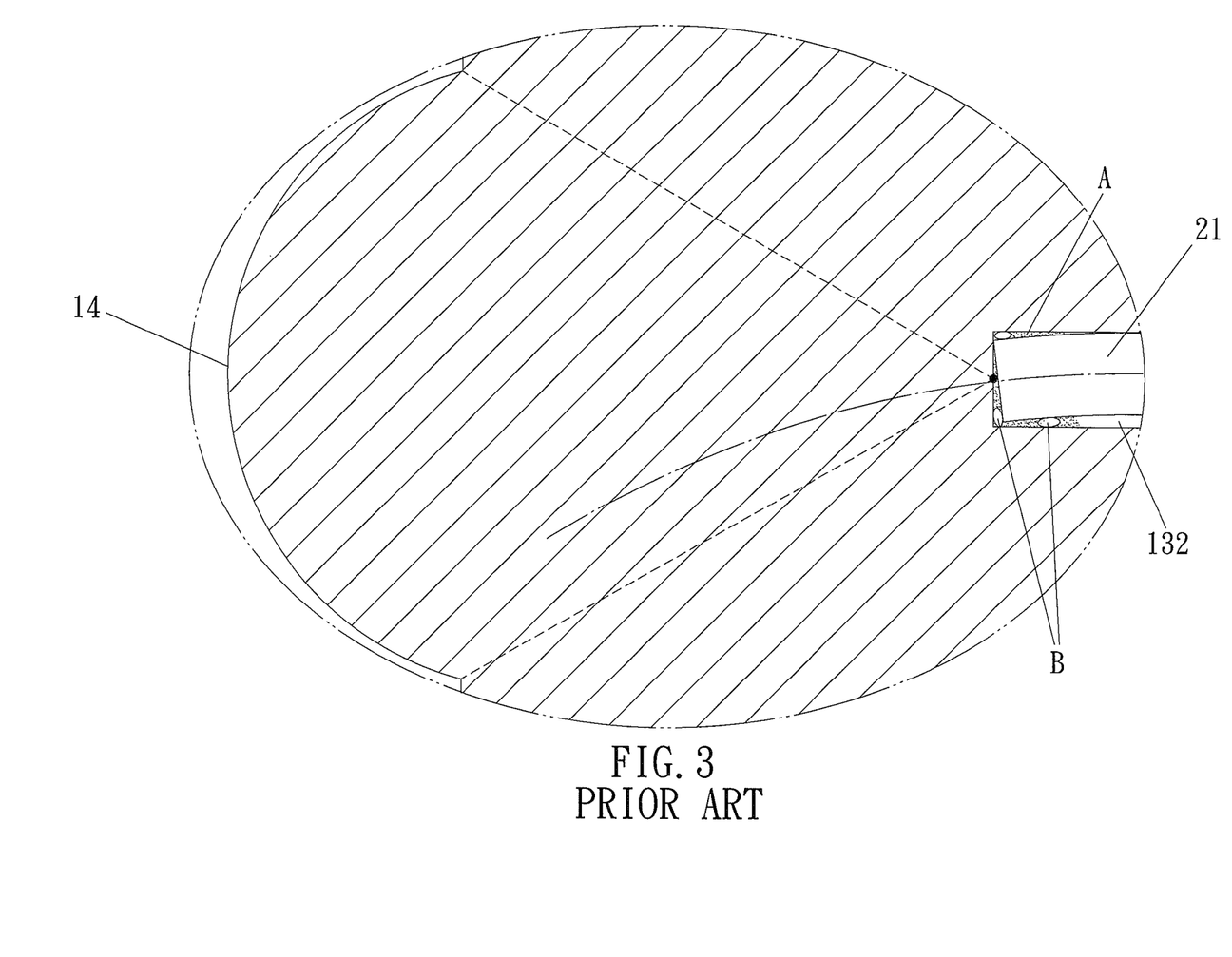
FIG. 3 is a cross-sectional side view of the conventional guiding connector with imprecise alignment.

Under a perfect manufacturing environment, the optical fiber cable 20 should combine into the accommodating holes 13 inside the guiding connector 10. However, the combination of the optical fiber cable 20 cannot be achieved ideally. The followings are reasons for such a bad combination: the accommodating hole 13 is a blind hole and the positioning section 132 of the accommodating hole 13 only has a slight diameter difference about 0.0-0.5 micrometer to the outer diameter of the optical fiber cable 20. Moreover, glue A is applied thereon. Therefore, when the optical fiber cable 20 is inserted into the positioning section 132, it fully blocks the positioning section 132, and gas inside the positioning section 132 of the accommodating hole 13 cannot be discharged. The gas remaining between the positioning section 132 and the optical fiber cable 20 forms a bubble B as shown in FIG. 3, and the distal end 200 of the optical fiber cable 20 cannot be ideally precisely flush with the bottom of the positioning section 132 of the accommodating hole 13. The good yield rate of the combination is low. Once the alignment between the positioning section 132 and the optical fiber cable 20 is found imprecise during examination, the optical fiber cable 20 should be withdrawn and reprocessed for alignment again, so that the processing time of the conventional guiding connector 10 is extended. Moreover, the tiny bubble B is not easily found during assembly. Once the optical fiber cable 20 is in use, heat will make the bubble B expand and, thus, influence the assembly precision of the optical fiber cable 20. As shown in FIG. 2, when the assembly is perfect, the optical fiber 21 precisely aligns with the convex lens 14 inside the accommodating hole 13. As shown in FIG. 3, when bubbles exist, the optical fiber 21 deviates or cannot be flush with the convex lens 14 inside the accommodating hole 13 so that it is out of focus.

Although the conventional electricity-generating device achieves the fundamental requirement and efficiency with respect to the electricity-generating application, it still has drawbacks and insufficiency about environmental issues, stability, economic and development efficiencies, and exclusivities of industrial application so that it cannot develop a more specific industrial application.

SUMMARY OF THE INVENTION

A main objective of the present invention is to provide a guiding connector that makes the assembly of optical fiber cables quick and easy with a good yield rate.

To achieve the foregoing objective, the guiding connector for optical fiber extension combines with at least one optical fiber cable which contains an optical fiber.

The guiding connector has a first end and the second end, and at least one side face extended between the first end and the second end. The first end has at least one accommodating hole extending to the second end. Each of the least one accommodating hole has one end having an expansion section with a large diameter and has the other end having a positioning section with a small diameter and a bottom end. At least one ventilative recess is defined on the at least one side face at the first end to communicate with the positioning section of each accommodating hole to form a ventilative portion.

The optical fiber of the optical fiber cable penetrates the expansion section of the accommodating hole to enter the positioning section until a distal end of the optical fiber is flush with the bottom end of the positioning section.

Further benefits and advantages of the present invention will become apparent after a careful reading of the detailed description with appropriate reference to the accompanying drawings.

DETAILED DESCRIPTION OF THE PREFERRED EMBODIMENTS

A guiding connector for optical fiber extension in the present invention has a positioning section in the accommodating hole to receive a optical fiber and has a ventilative recess defined on one side to communicate with the positioning section of the accommodating hole to make the positioning section adjacent to the ventilative recess to achieve a ventilative portion and to discharge gas inside the positioning section so that the optical fibers are assembled and processed precisely and rapidly.

Figure 4:
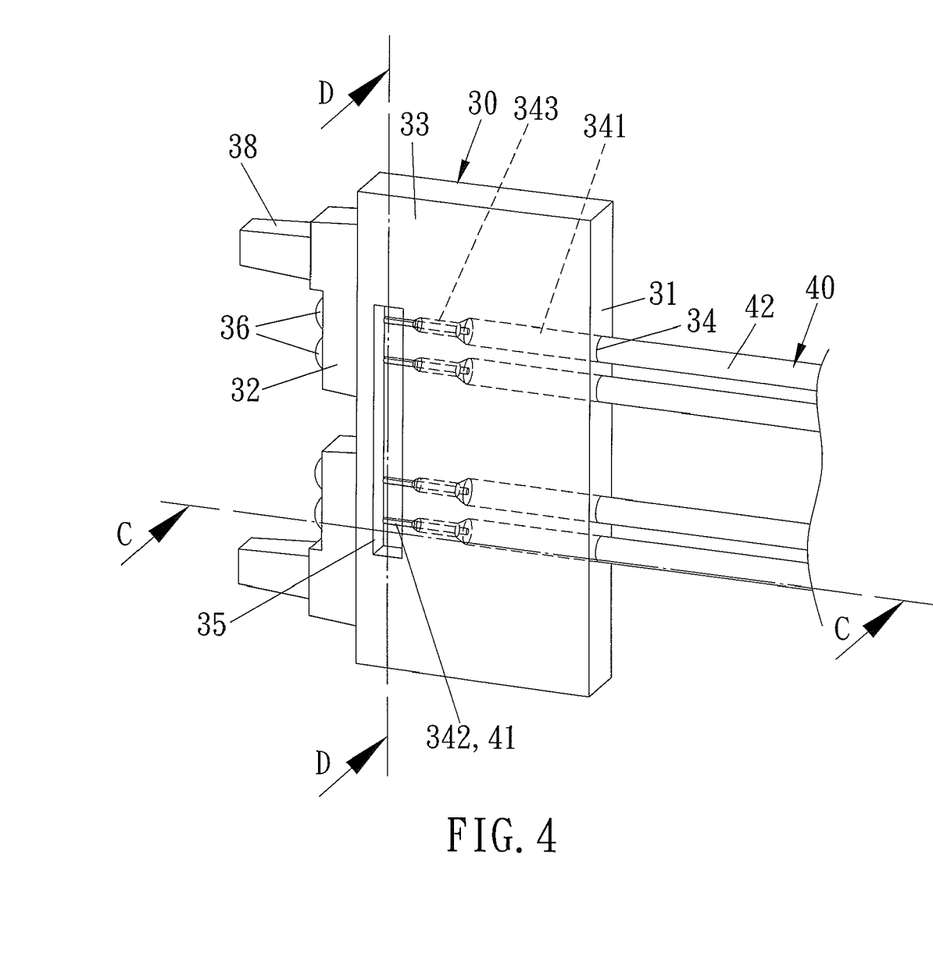
FIG. 4 is a perspective view of a guiding connector for optical fiber extension in accordance with the present invention.
Figure 5:
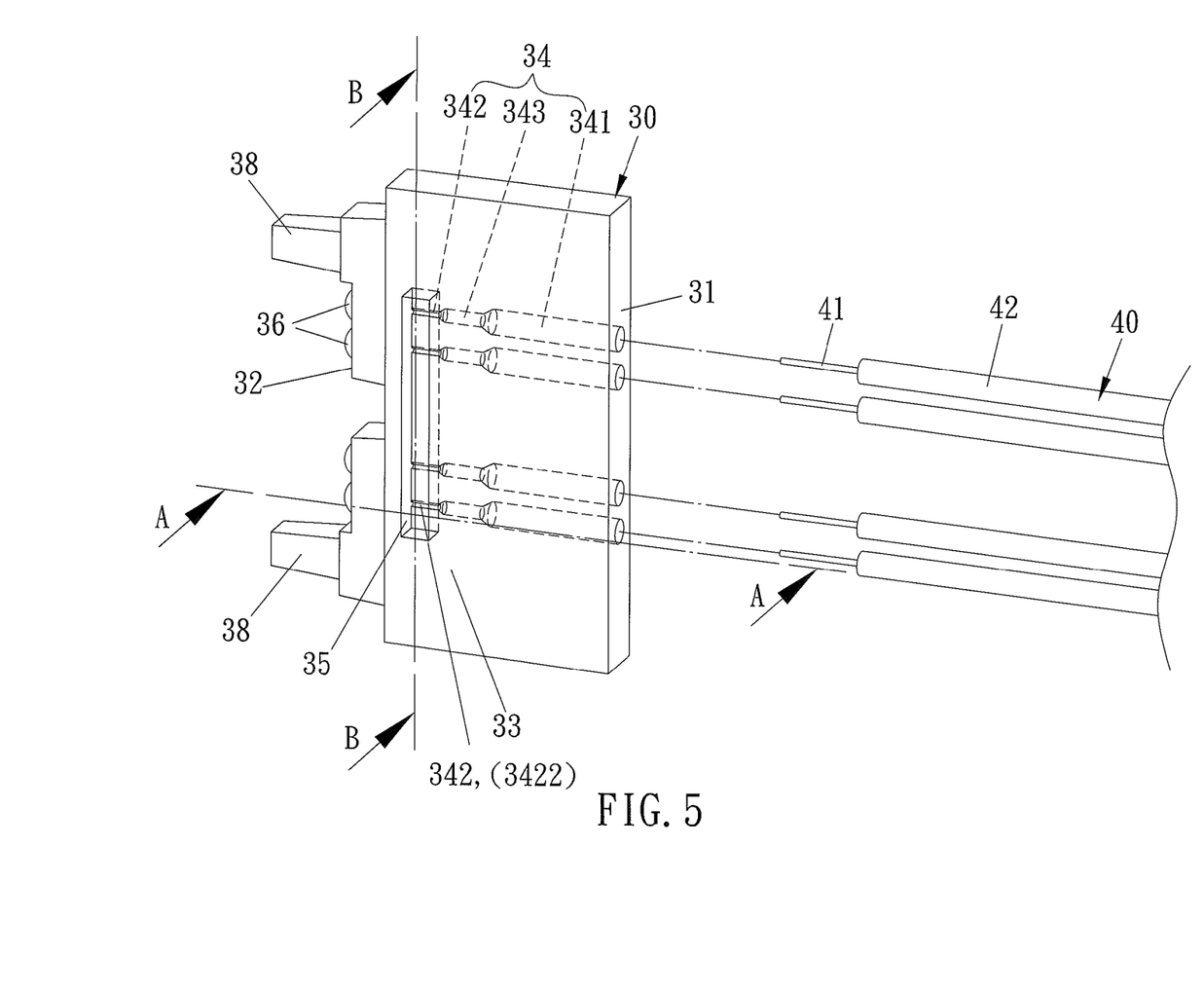
FIG. 5 is an exploded perspective view of the guiding connector in FIG. 4.

As shown in FIGS. 4 and 5, the guiding connector 30 in the present invention combines at least one optical fiber cable 40.

The optical fiber cable 40 is composed of an optical fiber 41 wrapped by a tube 42.

Figure 6:
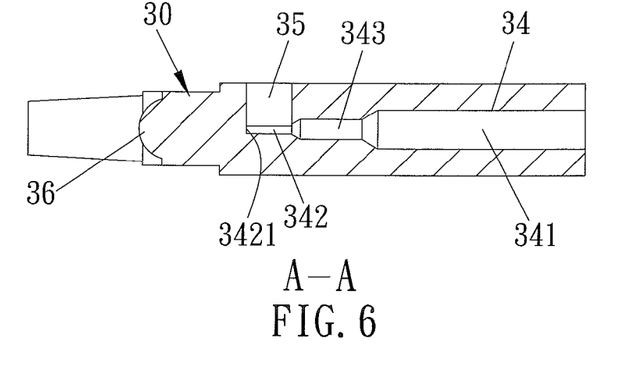
FIG. 6 is a cross-sectional side view of an accommodating hole of the guiding connector along line A-A in FIG. 5.
Figure 7:
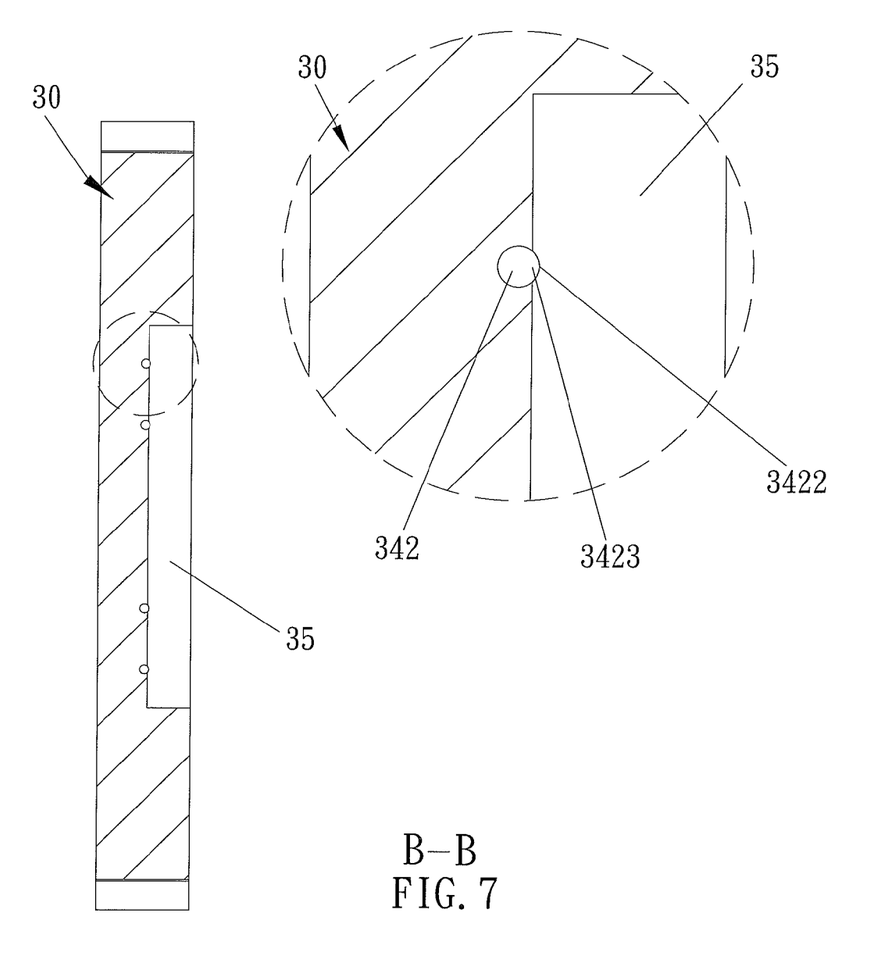
FIG. 7 is a cross-sectional front view of the accommodating hole of the guiding connector along line B-B in FIG. 5.

The guiding connector 30 has a first end 31 and a second end 32. At least one side face 33 extends between peripheries of the first end 31 and the second end 32. The first end 31 has at least one accommodating hole 34 extending to the second end 32. One end of the accommodating hole 34 is an expansion section 341 having a large diameter to make the optical fiber cable 40 easily accessible. As shown in FIGS. 6 and 7, another end of the accommodating hole 34 is a positioning section 342 with a round profile having a small diameter which is of 0.0-0.5 micrometer slightly larger than an outer diameter of the optical fiber 41. The positioning section 342 of the accommodating hole 34 has a bottom end 3421. A guiding section 343 with two tapered ends is defined between the expansion section 341 and the positioning section 342. At least one ventilative recess 35 is defined on the at least one side face 33 to communicate with the positioning section 342 of the accommodating hole 34 to performs form the ventilative portion 3422 in the positioning section 342. A width 3423 of the ventilative portion 3422 is smaller than the outer diameter of the optical fiber 41. The second end 32 of the guiding connector 30 has at least one convex lens 36 aligning with the at least one accommodating hole 34 correspondingly and has two positioning posts 38.

Figure 8:
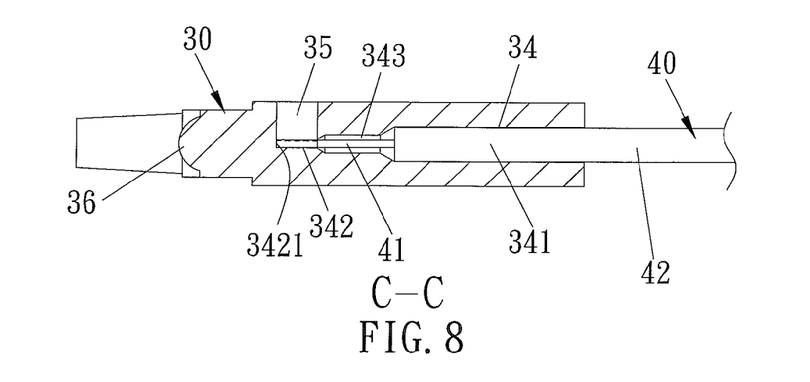
FIG. 8 is a cross-sectional side view of assembly of the accommodating hole and an optical fiber cable along line C-C in FIG. 4.
Figure 9:
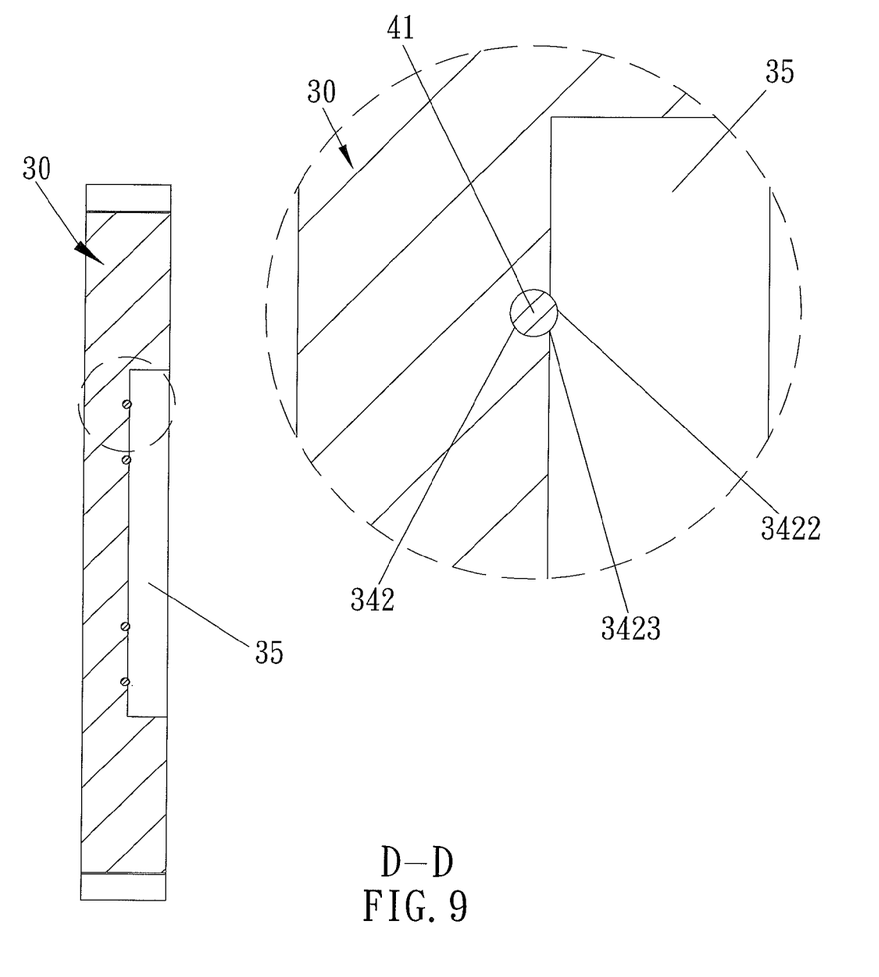
FIG. 9 is a cross-sectional front view of assembly of the accommodating hole and the optical fiber cable along line D-D in FIG. 4.

Combination of the guiding connector 30 and the optical fiber cable 40 is shown in FIGS. 4, 8 and 9. The optical fiber cable 40 has a distal end with its tube 42 removed to expose a part of the optical fiber 41 coated with glue. The exposed part of the optical fiber 41 penetrates the expansion section 341 of the accommodating hole 34 at the first end 31 and enters into the positioning section 342 via the tapered ends of the guiding section 343. When the distal end of the exposed part of the optical fiber 41 is flush with the bottom end 3421 of the positioning section 342 of the accommodating hole 34 and the glue dries, combination of the guiding connector 30 and the optical fiber cable 40 is achieved. As shown in FIG. 8, when the optical fiber 41 is inserted into the positioning section 342, the gas inside the positioning section 342 is discharged via the ventilative recess 35 to make the optical fiber 41 straightly and precisely flush with the bottom end 3421 of the positioning section 342.

Figure 10:
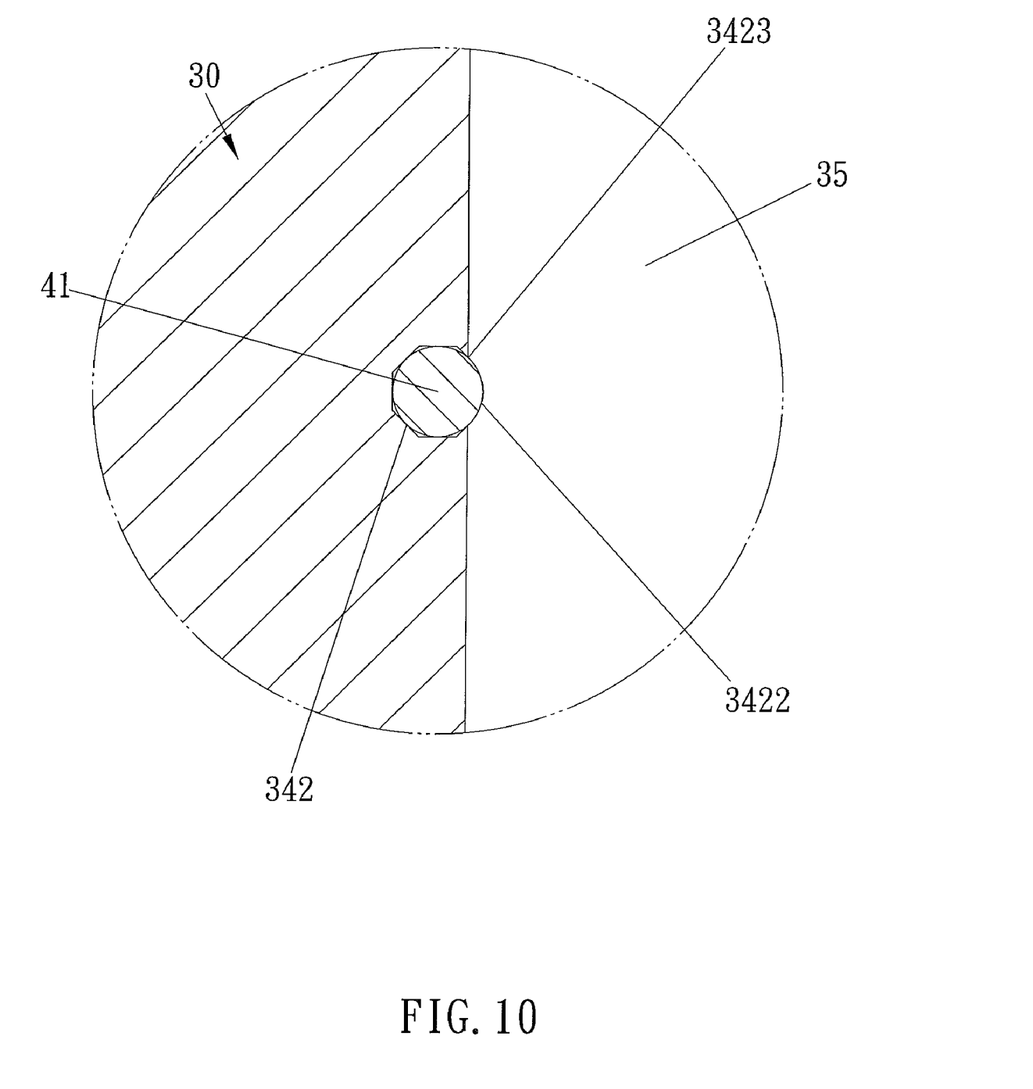
FIG. 10 is a cross-sectional front view of one embodiment of a positioning section of the accommodating hole in accordance with the present invention.

The positioning section 342 is a hole with round or polygonal profiles. As shown in FIG. 7, the positioning section 342 is with a round profile. As shown in FIG. 10, the positioning section 342 is with a polygonal profile.

Figure 11:
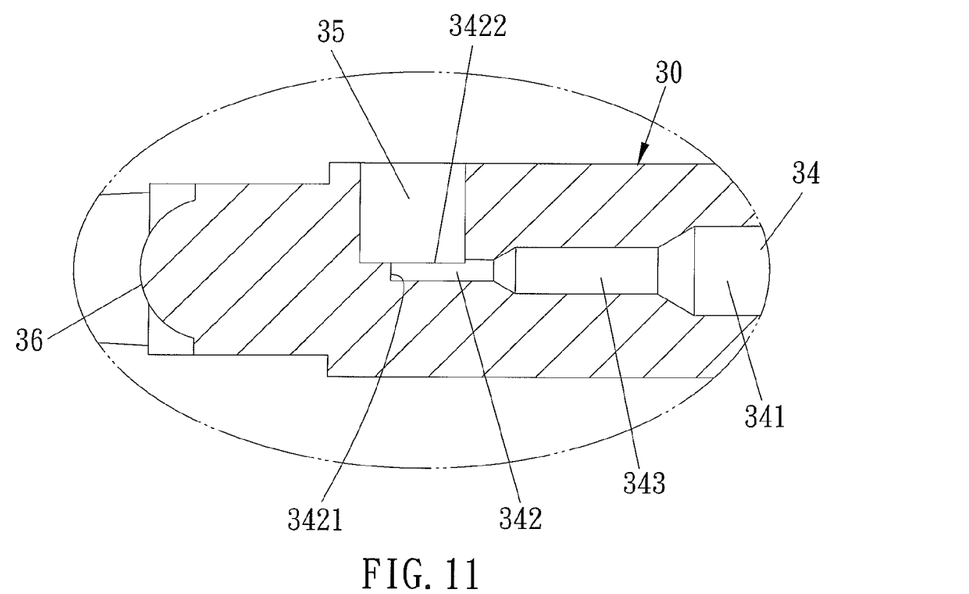
FIG. 11 is a cross-sectional side view showing an embodiment of a positioning section and a ventilative recess in accordance with the present invention.
Figure 12:
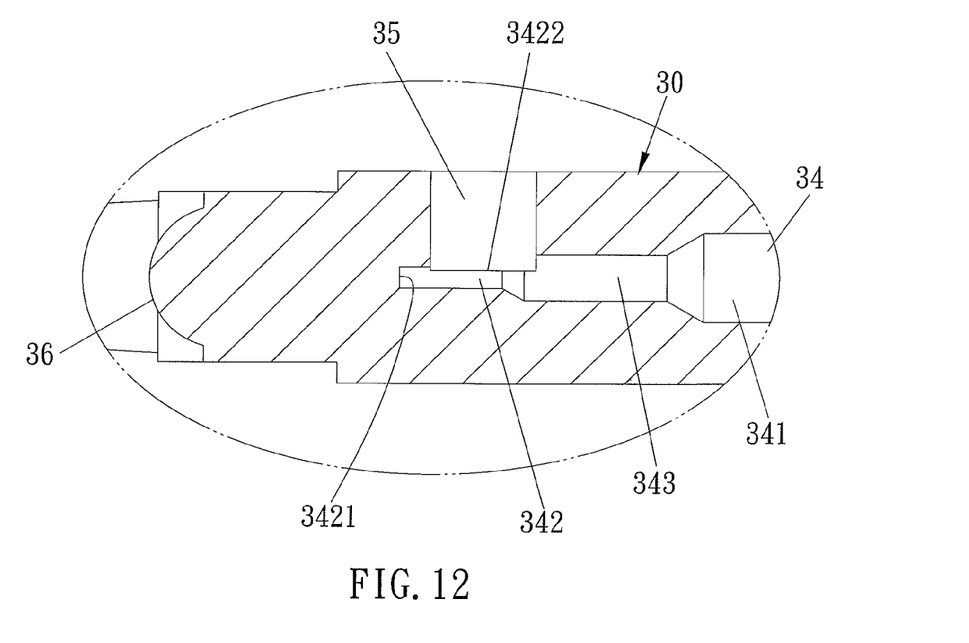
FIG. 12 is a cross-sectional side view showing another embodiment of a positioning section and a ventilative recess in accordance with the present invention.

The bottom end 3421 of the positioning section 342 is flush with an edge of the ventilative recess 35 (as shown in FIG. 6) or is within the ventilative recess 35 with less than a 2 mm deviation from the edge of the ventilative recess 35 (as shown in FIG. 11) or is outside the ventilative recess 35 with less than a 2 mm deviation from the edge of the ventilative recess 35 (as shown in FIG. 12).

Figure 13:
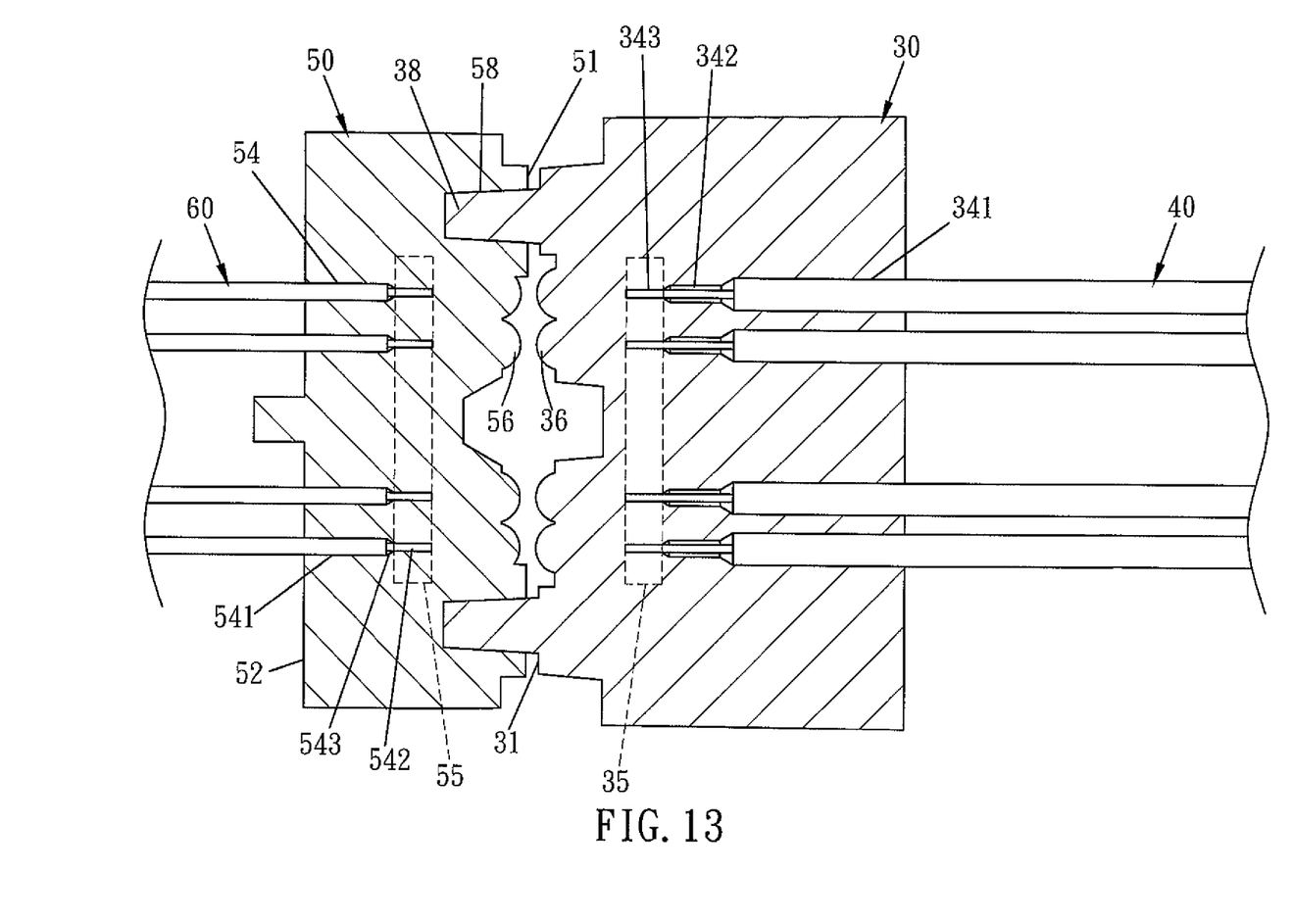
FIG. 13 is a cross-sectional side view showing combination of two guiding connectors in accordance with the present invention.

As shown in FIG. 13, the guiding connector 30 assembles with the optical fiber cable 40 and then engages a mating connector 50.

The mating connector 50 has a first end 52 and a second end 51. At least one side face extends between peripheries of the first end 52 and the second end 51. The first end 52 has at least one accommodating hole 54 extending to the second end 51 to assemble with another set of optical fiber cables 60. One end of the accommodating hole 54 is an expansion section 541 having a large diameter, and another end of the accommodating hole 54 is a positioning section 542 having a small diameter. At least one ventilative recess 55 is defined on the at least one side face to communicate with the positioning section 542 of the accommodating hole 54 to form the ventilative portion in the positioning section 542. A width of the ventilative portion is smaller than the diameter of the optical fiber of the set of the optical fiber cable 60. The second end 51 of the mating connector 50 has two positioning recesses 58 to engage the positioning posts 38 on the guiding connector 30 and has at least one convex lens 56 correspondingly aligning with the at least one convex lens 36 on the guiding connector 30 correspondingly.

According to above-mentioned structure of the preferred embodiments, the guiding connector 30 has the following advantages.

When the optical fiber 41 enters into the positioning section 342 of the accommodating hole 34, the gas in the positioning section 342 is discharged via the ventilative recess 35 defined on the side face 33 of the guiding connector 30 so that the optical fiber 41 enters the positioning section 342 without gas pressure resistance to make the position and alignment straight, precise and rapid to significantly increase production capability. Moreover, because the gas can be discharged to eliminate the bubble, the guiding connector has the advantage of high yield rate, and re-processing caused by the bubble is thus decreased.

By having the design of communicating the ventilative recess 35 with the positioning section 342, the gas inside the positioning section 342 is discharged by the ventilative recess 35, so that cost of the process equipment and procedures is significantly reduced.

The transmission loss of the optical fiber should be less than 1.5 db according to relative regulation. The conventional guiding connector has an average transmission loss of 2.2 db, so that the yield rate is low, and the assembled the conventional guiding connectors and the optical fiber cables should be fully examined. The guiding connector 30 in the present invention has an average transmission loss of 0.7 db, which is much less than the 1.5 db of relative regulation, so that production has a high yield rate, and only sample tests are sufficient to reduce examination cost.

Figure 14:
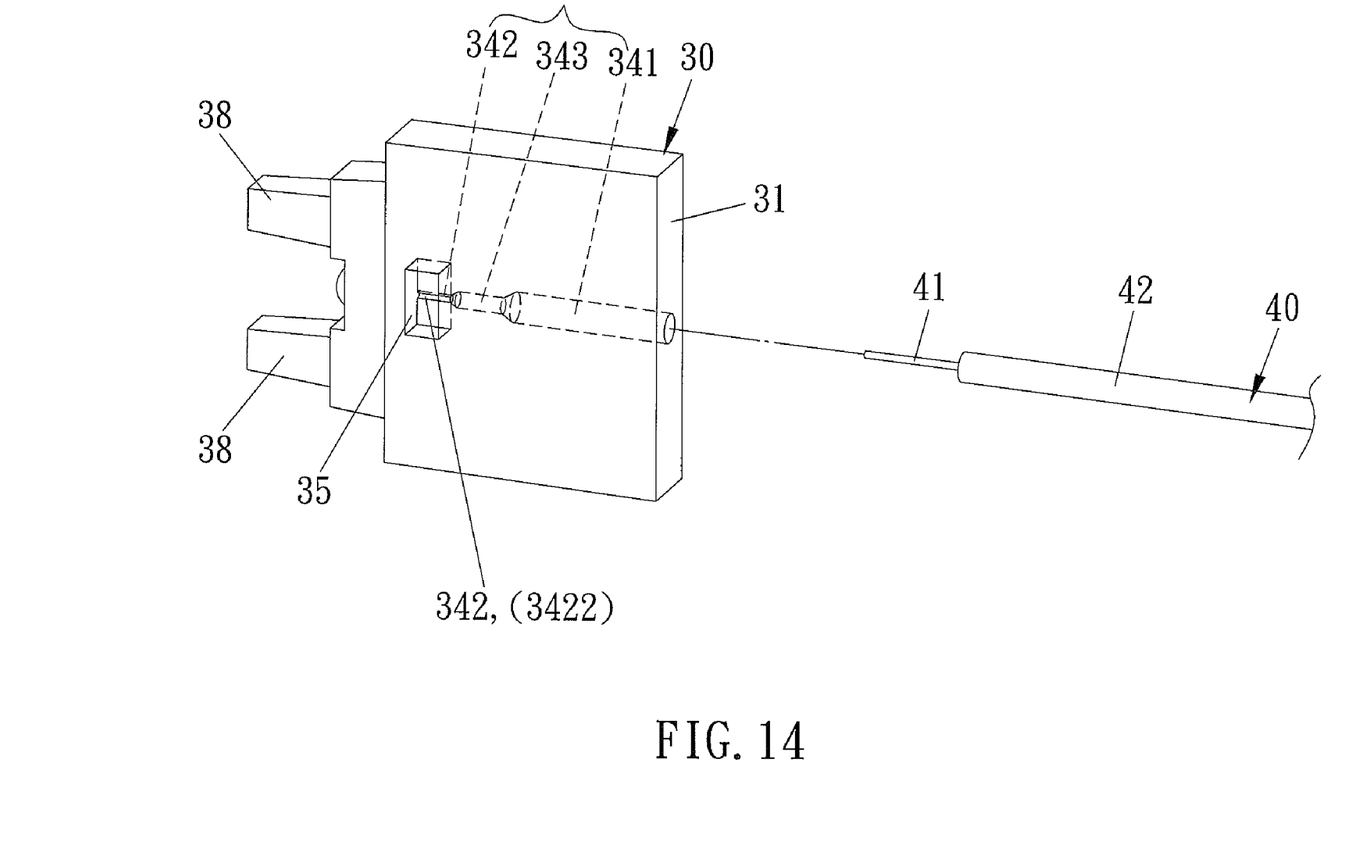
FIG. 14 is a perspective view of another embodiment of the guiding connector in accordance with the present invention.

The combination of the guiding connector 30 is with a plurality of multiple optical fiber cables 40 in line (as shown in FIG. 5) or only with a single optical fiber cable 40 (as shown in FIG. 14).

Although this invention has been described in its preferred forms with a certain degree of particularity, it is understood that the present invention of the preferred forms has been made only by way of example, and that numerous changes in the details of construction and the combination and arrangement of parts any be resorted to without departing from the spirit and scope of the invention.

What is claimed is:

1. A guiding connection for optical fiber extension comprising:
    at least one optical fiber cable containing an optical fiber having a diameter; and
    a guiding connector having a first end, a second end, and at least one side face extended between the first end and the second end, wherein the first end has at least one accommodating hole extending to the second end; wherein each at least one accommodating hole has one end having an expansion section with a large diameter and has another end having a positioning section with a small diameter and a bottom end; wherein at least one ventilative recess is defined on the at least one side face at the first end to communicate with the positioning section of each at least one accommodating hole to form a ventilative portion, wherein the ventilative portion has a width parallel to the diameter of the optical fiber, with the width of the ventilative portion being smaller than a diameter of the optical fiber;
    wherein the optical fiber of the optical fiber cable penetrates the expansion section at the first end of the at least one accommodating hole to enter the positioning section until a distal end of the optical fiber is flush with the bottom end of the positioning section.

2. The guiding connection as claimed in claim 1, wherein the optical fiber of the optical fiber cable is coated with a tube.

3. The guiding connection as claimed in claim 1, wherein the positioning section has a round profile or a polygonal profile.

4. The guiding connection as claimed in claim 1, wherein a guiding section with two tapered ends is between the expansion section and the positioning section.

5. The guiding connection as claimed in claim 1, wherein the second end of the guiding connector has at least one convex lens correspondingly aligned to the at least one accommodating hole respectively.

6. The guiding connection as claimed in claim 1, wherein the second end of the guiding connector has two positioning posts; and
    a mating connector has two positioning recesses to engage with the two positioning posts respectively for combination.

7. The guiding connector connection as claimed in claim 1, wherein the optical fiber is coated with glue and inserts inserted into the positioning section for combination.

8. The guiding connection as claimed in claim 1, wherein the bottom end of the positioning section is flush with an edge of the ventilative recess, or is within the ventilative recess, is outside the ventilative recess.

* * * * *